Sept. 18, 1934.  S. L. KELLY  1,974,051
GATHERING TOOL FOR CONGEALED MATERIAL
Filed April 14, 1933   2 Sheets-Sheet 1
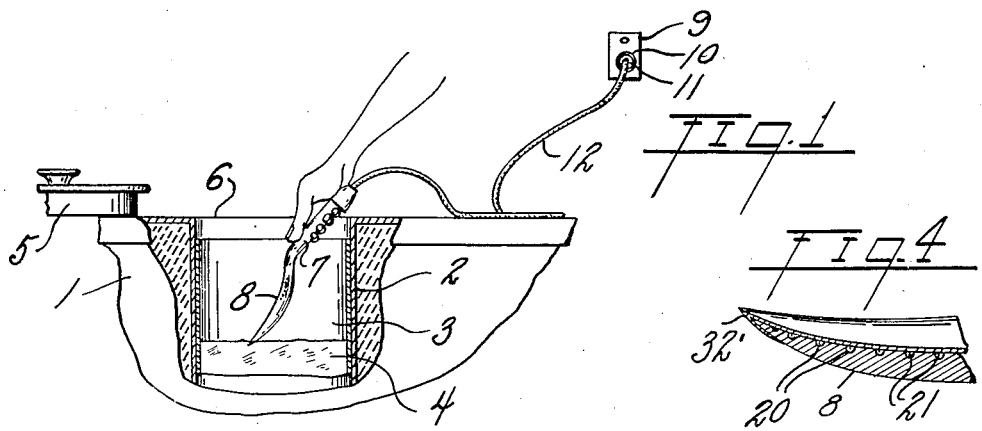
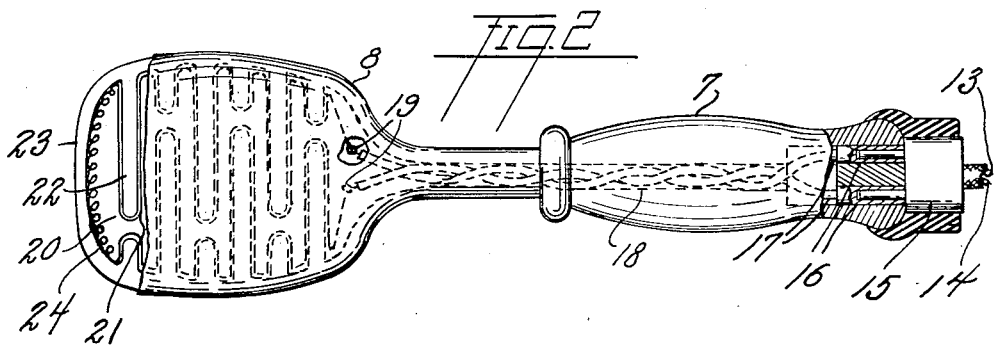
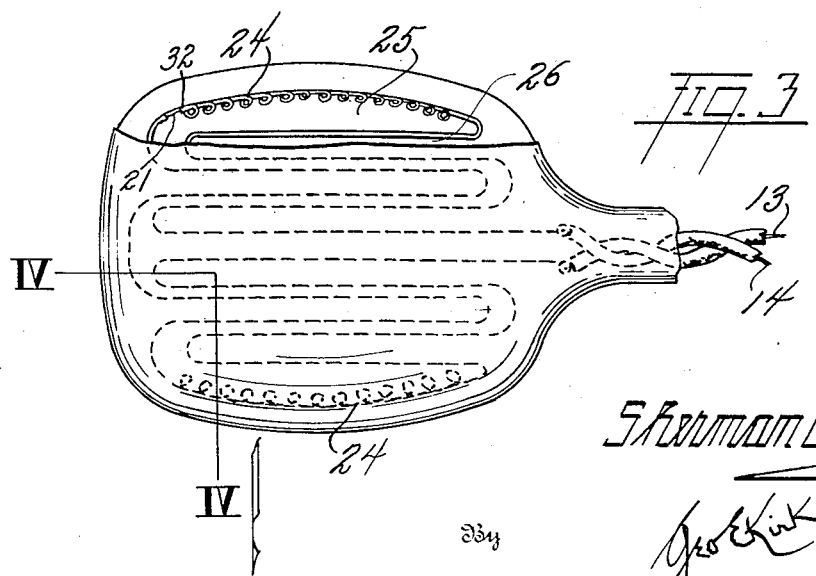
Inventor
Sherman L. Kelly
By
Geo. E. Kirk
Attorney Sept. 18, 1934. S. L. KELLY 1,974,051
GATHERING TOOL FOR CONGEALED MATERIAL
Filed April 14, 1933 2 Sheets-Sheet 2
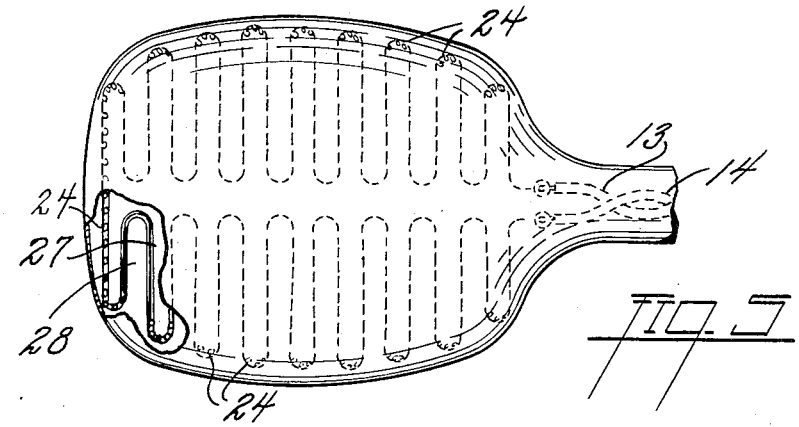
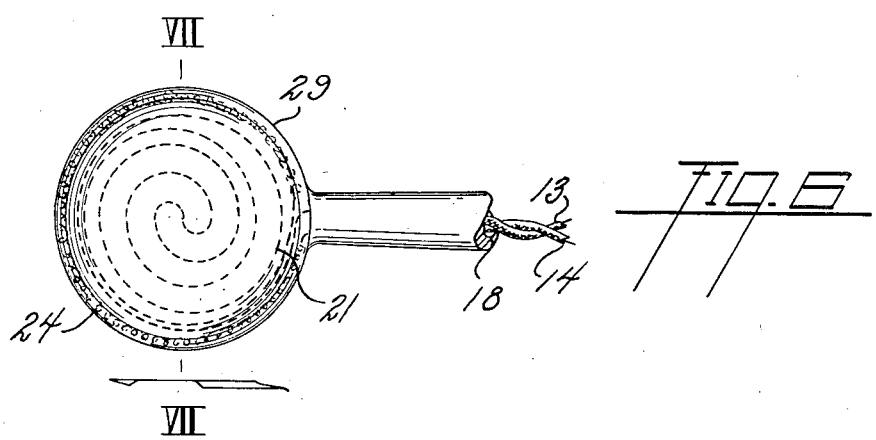
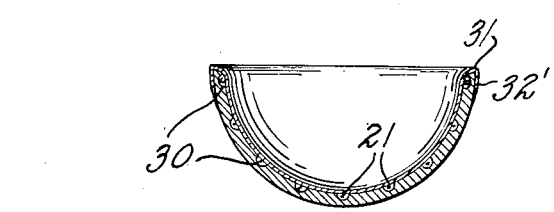

Patented Sept. 18, 1934

1,974,051

UNITED STATES PATENT OFFICE 1,974,051

GATHERING TOOL FOR CONGEALED MATERIAL

Sherman L. Kelly, Toledo, Ohio

Application April 14, 1933, Serial No. 666,115

2 Claims. (Cl. 219—21)

This invention relates to tools for separating portions from bulk material.

This invention has utility when incorporated in so-called spades, cups, dippers, cone molds, dishers, etc., for removing service portions of semi-solid or congealed confections, such as ice cream and ices, from a bulk body thereof.

Referring to the drawings:

Fig. 1 is a fragmentary view of an embodiment of a tool in use in accordance with the invention herein;

Fig. 2 is a plan view, with parts broken away, of the tool of Fig. 1;

Fig. 3 is a fragmentary view of a tool of the spade type of Fig. 2 having variant from the heat control feature of the invention of Fig. 2;

Fig. 4 is an enlarged section on the line IV—IV, Fig. 3;

Fig. 5 is a view similar to Fig. 4, with an additional type of heat control winding therein;

Fig. 6 is a view of a cup or ice cream cone type of dipper as distinguished from the spade of Fig. 1; and Fig. 7 is a section on the line VII—VII, Fig. 6.

Counter or refrigeration safe 1 may have chilling pocket 2 therein for reception of container 3 as a holder for bulk congealed confection, as ice cream 4. Heat insulating cover 5 may be removed, thereby leaving access opening 6. Attendant may grip handle 7 and thrust tool 8 through the opening 6 for embedding in the ice cream 4 in removing a service portion therefrom.

In carrying out the invention herein, facility for this operation with avoidance of packing the commodity is attained. Such commodity, as ice cream, in its frozen state is porous and of a bulk which is readily diminished by applying pressure thereto. Furthermore, this pressure as imposing packing, in some instances is considered detracting from flavor or the desirability of the substance for food. Accordingly, importance attaches to maintaining the bulk not only for this reason of maintaining its appetizing value, but there is the trade value for the merchandiser, in that the service portion has its volume appearance. Experience has shown that, from the use of tools in removing service portions, a loss of between 15 and 20 per cent in bulk may follow, and inasmuch as these service portions are based on volume price, there is a direct shrinkage for the retailer, obviated by carrying out the invention herein involving fusion of the congealed substance, but maintaining such fusion only for a cutting line, thereby avoiding crowding of the substance by the cutting line action. This effects severance of the substance without packing such substance.

In carrying out this feature of the invention herein, applicant determines a temperature for the tool, especially the cutting edge or margin thereof, which in the instance of ice cream, is effective in the region of 110° F., and that in the normal movement rate for a tool in effecting the severance of a service portion, the temperature is not one dissipated into the bulk of the material to effect fusion thereof.

At wall plate 9 having socket 10, there may be inserted fitting 11 having electric conduit 12 therefrom for electric conductors 13, 14, extending to detachable fitting 15 at handle 7. These conductors 13, 14, are effective through the detachable fitting 15 for closing circuit at terminals 16 in the handle 7. From these terminals 16, electric conductors 17 extend through way 18 in the handle 7 to terminals 19 at the tool 8. This tool 8 is shown as having ways 20 therein. In these ways 20 electric conductor heater 21 extends about spacer means 22 separating the ways 20. The major effective working edge or margin 23 of the tool 8, in carrying out the invention herein, is in use subjected to a maximum of chilling action, due to the fact that it provides the thrusting edge for the tool 8 into the bulk material 4. In compensation therefor, this heating element 21 may have its effectiveness increased by forming such in helix 24 in such region of maximum exposure.

Instead of the general direction of the ways 20 being transverse of the tool 8, there may be ways 25 (Fig. 3) extending generally longitudinally of the tool 8 with intermediate spacing means 26. Instead of these ways 20 extending in the staggered relation of Fig. 2, there may be approximately bi-laterally symmetrical grouping of ways 27 and intermediate spacing means 28 (Fig. 5). While the tool 8 is shown as a spade type, it may be, with these temperature controls, a departure from this spoon form, even to that of cup 29. Herein, the conductors 21 are shown in general spiral path in ways 30 and as approximating parallelism in this path.

With circular rim 31 as the severance effecting means exposed to the extreme in temperature for heat transference, the helix 24 for the element 21 may be in proximity to such rim 31. Whether the design be of two parts to expose the ways for embedding of the conductor 21 therein as protected from such parts by insulation 32, or there be other configuration for assembly, it is desirable that the completed device be unitary with features of safety and sanitary article.

To this end, the interior and exterior, when made in two parts, may have assembly at the rim or margin 23, 31. In such assembly there may be over-lap 32 with assembly even by brazing, soldering or swaging and plating. A feature in this connection is that at such rim or margin, there may accumulate a mass of relatively low heat conductivity material, so that the retention of heat during the cutting or severance is maintained. This holding of the heat as against freely conducting the heat, reduces the tendency to disperse heating or melting action throughout the bulk. It is conducive for production of a neat appearance severance line.

With this maintenance of the temperature for the margin or rim as the active portion of the tool for severance, it is only necessary that the sustaining or cup portion of the tool inward from the margin be of a temperature against sticking of the congealed mass thereto. Accordingly, with the rim at a temperature of say 110° to 120° F., there may be somewhat of a drop for the bowl portion of the tool.

In normal practice, the very brief interval in shifting the tool from the bulk material to the location for deposit of the service portion, whether in a cone or on a dish or tray, is an interval that may not cause shrinkage of this service portion, and due to the temperature of the tool is an operation thereby allowing the portion itself to lubricate the tool in freeing therefrom by merely orienting the tool so that the service portion may fall out therefrom. There is accordingly no tendency for whatever may be the material to accumulate on the tool. However, it is advisable, when the attendant discontinues use of the tool, to rinse such tool as in clear water.

In practice it may not be necessary as the tool may be intermittently used, for the attendant to disconnect the electric current supply, for in the design herein, the resistance is desirably proportioned to maintain as a maximum during exposure to air at normal temperature, the severing temperature for the rim or margin. This warming of the heater increases its electrical resistance, and thereby automatically chokes down the electric current for holding the temperature as a constant. Immediately the tool is introduced into the material and responds to chilling action, the conductivity of the resistance increases and there is an automatic electrical response for compensating the tool against said drop in temperature, and this temperature for the effective and efficient operation hereunder, may be held within a few degrees.

In many instances the speed with which the attendant may remove the service portions from a bulk container is of importance, especially at those periods wherein trade is brisk. In such instances there may be purpose in having the tool effective as an ejector, should there seemingly exist a suction against ready dropping of the service quantities from the gathering tool. In these instances an ejector of screw type, swing vane type, or lever type may cooperate for maintaining speed of service.

This mode of severing service portions has its facility for operation with a minimum of strain upon the attendant for effecting severance of the service portions. This facility for operating may be one conveniently effective at a lower temperature for the commodity, as ice cream. This means that the manufacturer and merchant may bring the ice cream to a relatively lower temperature and hold it at such temperature as an approximate constant, say in the range of 0° F. to 8° above. Due to this holding and keeping of the cream away from fluctuations or tendency to fluctuate, there is established an improved quality for the cream, not only in appearance but taste, for the uniformity of the cream as produced can be thereby held until the commodity is dispensed to the consumer.

What is claimed and it is desired to secure by Letters Patent is:

1. A congealed material gathering tool having a supporting portion for gathered material, said portion gradually tapering into a cutting edge, and a heating element disposed within the portion so as to produce maximum heating effect near the edge.

2. A congealed material portion gathering tool having a supporting portion and a cutting edge, and heating means within the supporting portion so disposed as to produce maximum heating effect near the edge, said supporting portion and edge forming a gradually tapering wedge.

SHERMAN L. KELLY.